United States Patent
Wei et al.

(10) Patent No.: US 12,459,035 B2
(45) Date of Patent: Nov. 4, 2025

(54) NANOPARTICLES AND METHODS OF MAKING NANOPARTICLES

(71) Applicant: University of Florida Research Foundation, Inc., Gainesville, FL (US)

(72) Inventors: Wei David Wei, Gainesville, FL (US); Wenxiao Guo, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 490 days.

(21) Appl. No.: 17/926,510

(22) PCT Filed: May 14, 2021

(86) PCT No.: PCT/US2021/032458
§ 371 (c)(1),
(2) Date: Nov. 18, 2022

(87) PCT Pub. No.: WO2021/236441
PCT Pub. Date: Nov. 25, 2021

(65) Prior Publication Data
US 2023/0182202 A1    Jun. 15, 2023

Related U.S. Application Data

(60) Provisional application No. 63/028,954, filed on May 22, 2020.

(51) Int. Cl.
| | |
|---|---|
| B22F 9/24 | (2006.01) |
| B01J 23/52 | (2006.01) |
| B01J 23/72 | (2006.01) |
| B01J 35/45 | (2024.01) |
| B01J 37/34 | (2006.01) |
| B22F 1/054 | (2022.01) |

(52) U.S. Cl.
CPC ............... *B22F 9/24* (2013.01); *B01J 23/52* (2013.01); *B01J 23/72* (2013.01); *B01J 35/45* (2024.01);
(Continued)

(58) Field of Classification Search
CPC .... B22F 9/24; B22F 2202/11; B22F 2301/10; B22F 2301/255; F22F 1/0553;
(Continued)

(56) References Cited

U.S. PATENT DOCUMENTS

2013/0095039 A1    4/2013   Lu et al.

FOREIGN PATENT DOCUMENTS

| DE | 102009002269 A1 * | 10/2010 | ................. B22F 9/24 |
| WO | WO-2017210060 A2 * | 12/2017 | ............ B22F 1/0018 |

OTHER PUBLICATIONS

Bi, Liyan, et al. "Shape-controlled synthesis of gold nanoplates and their self-assembly by repulsive electrostatic interactions." Journal of Nanoscience and Nanotechnology 12.6 (2012): 4514-4522.*
(Continued)

*Primary Examiner* — Richard M Rump
(74) *Attorney, Agent, or Firm* — Thomas |Horstemeyer LLP.

(57) ABSTRACT

The present disclosure provides for metal nanoparticles, such as gold nanoparticles that have six pointed areas so that the metal nanoparticle resembles a six-pointed star. The distance from opposing points of the six-pointed star is about 400 to 480 nanometers. The present disclosure also provides for a method of making the nanoparticle, where in an aspect, the method is a light-driven synthesis.

17 Claims, 8 Drawing Sheets

(52) U.S. Cl.
CPC ............ B01J 37/344 (2013.01); B22F 1/054 (2022.01); B22F 1/0553 (2022.01); *B01J 2235/10* (2024.01); *B01J 2235/30* (2024.01); *B22F 2202/11* (2013.01); *B22F 2301/10* (2013.01); *B22F 2301/255* (2013.01); *B22F 2304/054* (2013.01)

(58) Field of Classification Search
CPC .. F22F 1/054; B01J 35/50; B01J 23/50; B01J 23/52; B01J 23/72; B01J 37/344
See application file for complete search history.

(56) References Cited

OTHER PUBLICATIONS

English machine translation of DE102009002269.*
Jiang, Qingning, et al. "Synthesis and high electrocatalytic performance of hexagram shaped gold particles having an open surface structure with kinks." Nano Research 4 (2011): 612-622.*
Li, Jian-Min, et al. "An "edge to edge" jigsaw-puzzle two-dimensional vapor-phase transport growth of high-quality large-area wurtzite-type ZnO (0001) nanohexagons." Applied Physics Letters 101.17 (2012).*
Mazzucco, Stefano, et al. "Spatially resolved measurements of plasmonic eigenstates in complex-shaped, asymmetric nanoparticles: gold nanostars." The European Physical Journal-Applied Physics 54.3 (2011): 33512.*
Yamamoto, Mari, et al. "Synthesis and morphology of star-shaped gold nanoplates protected by poly (N-vinyl-2-pyrrolidone)." Chemistry of materials 17.22 (2005): 5391-5393.*
Markin et al., 'Copper nanostructures for chemical analysis using surface-enhanced Raman 6 spectroscopy', Trends In Analytical Chemistry, vol. 108, Sep. 17, 2018 (Sep. 17, 2018), p. 247-25.9.
Huang et al., 'Photochemically Controlled Synthesis of Anisotropic Au Nanostructures: 1-3, 5-6 Plateletlike Au Nanorods and Six-Star Au Nanoparticles', ACS Nano, vol. 4, No. 10, Oct. 6, 2010 (Jun. 10, 2010), p. 6196-6202.
ISR Mailed; Sep. 30, 2021, Application No. PCT/US21/32458.

* cited by examiner

NANOPARTICLES AND METHODS OF MAKING NANOPARTICLES

FEDERAL FUNDING

This invention was made with government support under Grant No. 1808539 and Grant No. DMR-1352328, awarded by the National Science Foundation. The government has certain rights in the invention.

CLAIM OF PRIORITY TO RELATED APPLICATION

This application claims priority to and is the 35 U.S.C. § 371 national stage of PCT application entitled "NANOPARTICLES AND METHODS OF MAKING NANOPARTICLES," having serial number PCT/US2021/032458, filed on May 14, 2021, which is entirely incorporated herein by reference. The PCT Application claims priority to U.S. provisional application entitled "NANOPARTICLES AND METHODS OF MAKING NANOPARTICLES," having Ser. No. 63/028,954 filed on May 22, 2020, which is entirely incorporated herein by reference.

BACKGROUND

Plasmon-driven growth of noble metal nanostructures has garnered extensive scientific interests in the past two decades, in particular, excitation of surface plasmon resonance (SPR) on seed nanoparticles produces energetic (or "hot") electrons to drive the photochemical reduction of precursors and form various nanostructures. Despite the presence of the hot holes, these were removed. As a result, these have not been investigated.

SUMMARY

The present disclosure provides for metal nanoparticles (e.g., a metal such as Au) having six pointed areas that resembles a six-pointed star. The present disclosure also provides for a method of making the nanoparticle.

In an aspect, the present disclosure provides for a composition, comprising: a nanoparticle having six pointed areas so that the nanoparticle resembles a six-pointed star, wherein a distance (e.g., a length) from opposing points of the six-pointed star is about 400 to 480 nanometers. The nanoparticle can a gold, silver, or copper nanoparticle. The nanoparticle can have a thickness of about 20 to 50 nanometers.

In an aspect, the present disclosure provides for a method of making a nanoparticle comprising: irradiating a metal nanoparticle growth solution at a first wavelength of less than 600 nanometers for a first time-frame; introducing an iodide compound to the growth solution to form a modified growth solution and irradiating the modified growth solution at a second wavelength of less than 600 nanometers for a second time-frame; and forming the metal nanoparticle having six pointed areas so that the metal nanoparticle that resembles a six-pointed star, wherein a distance from opposing points of the six-pointed star is about 400 to 480 nanometers. In an aspect, the first wavelength can be about 510 to 530 nanometers. In an aspect, the second wavelength can be about 510 to 530 nanometers. In an aspect, the present disclosure provides for a composition comprising: a nanoparticle made from method as described above or herein.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1A illustrates a six-pointed Au nanostars formed under 520±10 nm irradiation (3.4 mW/cm$^2$). FIG. 1B illustrates a regular Au nanoprisms formed under 640±10 nm irradiation (3.4 mW/cm$^2$). Scale bars in both FIG. 1A and FIG. 1B stand for 200 nm.

FIG. 3A illustrates SEM image of Au hexagonal nanoprisms formed in the initial 20-minute iodide-free growth; FIG. 3B illustrates SEM image of Au dodecagonal structures formed after a further 30-minute growth from that shown in FIG. 3A in the presence of KI; FIG. 3C illustrates SEM image of Au nanostars formed after another 30-minute growth from that shown in FIG. 3B in the presence of KI. Scale bars in all SEM images correspond to 100 nm. FIG. 3D illustrates a schematic showing the preferential etching (red arrows) at high-index edges that caused non-uniform growths (blue arrows) along different lateral directions to form Au nanostars.

FIG. 4A illustrates filtered HAADF-STEM image of one edge acquired along [011] zone axis. This edge is dominated by low-index facets as indicated in the figure. FIGS. 4B and C illustrates filtered HAADF-STEM images of another edge acquired along [112] zone axis. This edge is dominated by high-index facets. Green lines in FIGS. 4A, B, and C denote the location of low-index facets, while red and orange lines denote the location of high-index facets. Red and orange lines were used in alternative for a clear view. It should be noted that in FIG. 4A, facets with same indices align along different directions because of the existence of twin boundaries (i.e., a mirror plane). Scale bars in FIGS. 4A, B, and C all represent 2 nm.

FIG. 5A illustrates a schematic showing the orienting of Au nanostructures for measuring edge facets. The sample stage was tilted until the edge of interest aligns with the incident electron beam (blue arrow). FIG. 5B illustrates an example of the tilting process to align a nanostructure. The red circle indicated the edge to be imaged.

FIG. 6A illustrate a low-magnification SEM image of Au nanostars. The scale bar represented 500 nm. FIG. 6 illustrates a SAED pattern collected from an Au nanostar (corresponding TEM image shown in the inset) lying flat on a Cu grid. The pattern was indexed to a [111] zone axis, suggesting that the top and bottom surfaces of the nanostar are terminated by {111} facets, which was confirmed by atomic resolution HAADF-STEM imaging (not shown). {422} and {220} Bragg reflections were labelled. A forbidden ⅓{422} Bragg reflection marked by the white circle indicated the presence of planar defects.[3-6] Crystallographic directions within Au nanostars were extracted from the SAED pattern. As indicated in the inset TEM image, tips of Au nanostars grew along [112] directions (yellow solid arrows), and trenches grew along [110] directions (white dashed arrows). Only one pair of tips and trenches were labeled for a clearer view. FIG. 6C illustrates the UV-Vis spectrum obtained from an aqueous suspension of Au nanostars. The peak at ca. 900 nm stemmed from the Au nanostars, and the shoulder peak at ca. 600 nm originated from the small population of Au NPs grown from the penta-twinned Au seeds that remained in the growth solution after incubation and centrifugation.

FIG. 7A illustrates Au nanostars formed from the plasmon-driven growth in the presence of 4 µM of NaI. FIG. 7B illustrates regular nanoprisms formed from the plasmon-driven growth in the absence of iodide. FIG. 7C illustrates regular nanoprisms formed from the growth in the dark in the presence of iodide.

FIG. 8A-E illustrates Au nanostars formed when shorter wavelengths (<600 nm, 3.4 mW/cm$^2$) were used. FIG. 8F-H illustrates regular Au nanoprisms formed when longer wavelengths (600 nm, 3.4 mW/cm$^2$) were used. Scale bars stand for 500 nm in all figures.

FIG. 10D illustrates a statistical analysis of products formed at each stage. The yield of dodecagonal intermediate structures at 50 min was 59±3%, and the yield of nanostars at 80 min was 45±3%. Over 200 nanostructures were counted at each stage to obtain the distribution of structures. Scale bars in all FIGS. 10A, B, and C stand for 200 nm.

FIG. 11A illustrates a schematic showing the truncation of a regular Au nanoprism to form the dodecagonal intermediate. Edges marked with green color were composed of low-index facets that are typical for Au nanoprisms, and edges marked with orange color were newly formed intersecting edges with high-index facets. Two types of edges were arranged alternatively. FIG. 11B illustrates indication of the position of two edges on an individual dodecagonal intermediate structure examined by STEM. By arrangement, Edge 1 and edge 2 represented those two types of edges shown in FIG. 11A. FIG. 11C illustrates HAADF-STEM images along edge 1 of the intermediate dodecahedral structure. FIGS. 11D and E illustrates HAADF-STEM images along edge 2 of the intermediate dodecahedral structure. FIGS. 11C, D, and E are unfiltered copies corresponding to images shown in FIGS. 4A, 4B, and 4C of the main text, respectively. From the facet identification shown in FIG. 4, it can be concluded that edge 1 corresponded to a low-index green edge in FIG. 11A, and edge 2 corresponded to a high-index orange edge in FIG. 11A.

FIG. 13A illustrates a HAADF-STEM image of an early-stage nanostar's tip (indicated by the dashed frame). The tip mainly consisted of low-index facets, which indicated the faster growth of edges dominated by low-index facets of intermediate structures, confirming that tips of Au nanostars evolved from low-index edges of dodecagonal intermediate nanostructures. FIG. 13B illustrates a derived crystallographic direction within a dodecagonal intermediate nanostructure. As indicated in FIG. 4 in the main text, zone axes used to obtain HAADF-STEM images on a low-index edge and a high-index edge were [110] and [112](i.e., paralleled to chosen edges), respectively. Since the top and bottom faces of those dodecagonal intermediate nanostructures were bound by {111} facet, it can be derived from the crystal structure of Au that low-index edges grew along [112] directions and high-index edges grew along [110] directions, which matched with growth direction of tips (i.e., [112]) and trenches (i.e., [110]) of nanostars (FIG. 6B), respectively. This match in growth directions indicated that tips of nanostars evolved from low-index facets and trenches evolved from high-index facets.

FIG. 14A illustrates the formation of Au nanostars in the presence of 0.2 mM KBr under 460 nm irradiation. FIG. 14B illustrates the formation of regular Au nanoprisms in the presence of 4 µM KBr under 460 nm irradiation. FIG. 14C illustrates the formation of regular Au nanoprisms in the presence of 0.2 mM KBr under 560 nm irradiation. It can be seen that to obtain Au nanostars using bromide, a higher concentration of KBr and the shorter-wavelength irradiation that directly caused photoexcitation of Au (i.e., interband transitions) to form more d-band holes should be used. The scale bar stands for 200 nm in all images.

FIG. 15A illustrates an LSV scan obtained on a Au nanocrystal electrode in the presence of KBr. A peak at ca. 1.35 V vs. RHE stood for the one-electron oxidation of Au$^0$ to AuBr$_2^-$.[7] FIG. 15B illustrates I-t curves collected at 1.40 V vs. RHE showing the anodic photocurrent of a Au electrode in the presence of bromide. Shaded regions in FIG. 15B represented the light irradiation using either 530 nm (green curve) or 470±10 nm (blue curve) LED light source (240 mW/cm$^2$). A significant enhancement can be observed only when using the 470 nm irradiation.

DETAILED DESCRIPTION

Figure 1:
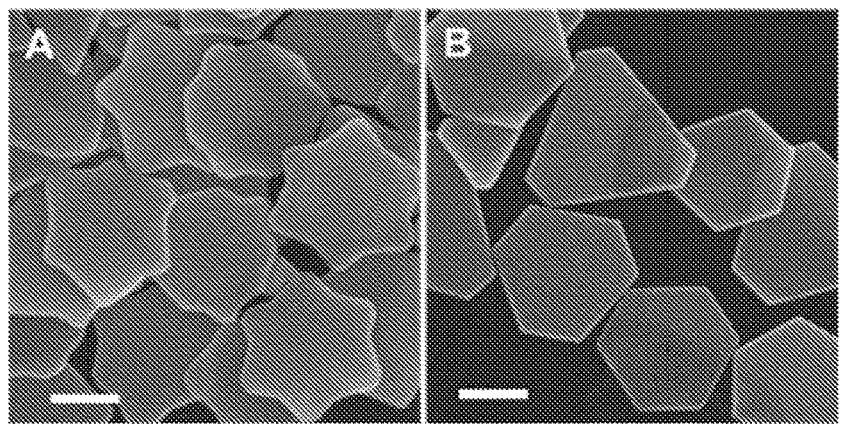
FIG. 1 illustrates scanning electron microscopy (SEM) images of Au nanostructures obtained from plasmon-driven growth of planar twinned Au seeds in the presence of iodide.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, materials science, mechanical engineering, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by volume, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequences where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

DISCUSSION

In accordance with the purpose(s) of the present disclosure, embodiments of the present disclosure provide for metal nanoparticles (e.g., a metal such as Au) having six pointed areas that resembles a six-pointed star. The present disclosure also provides for a method of making the nanoparticle. In particular, the method is a light-driven synthesis. Although it has been widely accepted that surface plasmon resonance (SPR)-generated energetic electrons play an essential role in this photochemical process, the exact function of plasmon-generated hot holes still remains elusive. The present disclosure provides for a method that includes the use of hot holes work with surface adsorbates (e.g., iodide compound) collectively to control the anisotropic growth of metal nanostructures, for example, gold (Au) nanostructures. In particular, it is found that hot holes stabilized by surface adsorbed iodide enable the site-selective oxidative etching of $Au^0$, which leads to non-uniform growths along different lateral directions to form six-pointed Au nanostars. The nanoparticles of the present disclosure can be used in smart windows, photocatalytic systems, and biomedical sensing.

The metal nanoparticle can have six pointed areas (e.g., each pointed area similar to a prism) that resembles a six-pointed star. The metal can include Au, Ag, Cu, and Pt. The distance from opposing points (e.g., a length or width) of the six-pointed star, in particular the gold nanostructure, is about 400 to 480 nanometers or about 410 to 470 nanometers. The nanostructure can have a thickness of about 20 to 50 nanometers. In particular, Au nanostars possess high-curvature sites that not only provide active sites in photocatalysis but also enable strong enhancement of local electromagnetic fields, rendering them promising candidates as SERS supports.

Although generally described here, additional details regarding the growth of the nanoparticles are provided in the Examples. The method includes irradiating a metal nanoparticle growth solution at a first wavelength of less than 600 nanometers for a first time-frame. The metal nanoparticle growth solution can include a gold nanoparticle growth solution (e.g., $HAuCl_4$), a silver growth solution (e.g., $AgNO_3$), or a platinum growth solution (e.g., $H_2PtCl_6$). The irradiation can be at a first wavelength of about 510 to 530 nanometers. The irradiation can be performed using a light source such as a LED that emits at the desired wavelength(s) such as those described herein, in particular those of the relevant SPR band for the particular metal. The first time-frame can be about 10 to 30 minutes or about 20 minutes.

After the initial irradiation, an iodide compound is mixed with the metal nanoparticle growth solution to form a modified growth solution. Then the modified growth solution is irradiated at a second wavelength of less than 600 nanometers for a second time-frame. The irradiation can be at a second wavelength of about 510 to 530 nanometers. The irradiation can be performed using a light source such as a LED that emits at the desired wavelength(s), which can be the same or similar to the first wavelength. The second time-frame can be about 30 to 90 minutes or about 60 minutes. The iodide compound can be is a salt of iodide, optionally potassium iodide or sodium iodide. Once the second irradiation is complete, a metal nanoparticle having six pointed areas that resembles a six-pointed star is produced.

EXAMPLES

Now having described the embodiments of the present disclosure, in general, example 1 describes some additional embodiments of the present disclosure. While embodiments of the present disclosure are described in connection with example 1 and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Plasmon-driven growth of noble metal nanostructures has garnered extensive scientific interests in the past two decades.[1-9] Previous studies have shown that the excitation of surface plasmon resonance (SPR) on seed nanoparticles produces energetic (or "hot") electrons to drive the photochemical reduction of precursors and form various anisotropic noble metal nanostructures.[6-7, 9-15] Nevertheless, it is noted that in all reported processes, hot holes (the counterparts of hot electrons) were purposely removed using hole scavengers,[2, 7, 10] and their functions have not yet been explored.

Herein, we found that those plasmon-generated hot holes worked cooperatively with surface adsorbates to control the anisotropic growth of Au nanostructures. Under visible-light irradiation, the addition of iodide into a growth solution containing planar-twinned Au seed produced six-pointed Au nanostars instead of regular nanoprisms.[7] Further studies showed that those Au nanostars were formed only under irradiations in the shorter-wavelength region (i.e., <600 nm) of Au SPR that generated highly energetic interband holes, suggesting a hot-hole-driven process in photochemical reactions. Additionally, photoelectrochemical studies showed enhancements in both the anodic open-circuit potential (OCP) shift and the oxidative photocurrent on a Au nanocrystal electrode in the presence of iodide. These observations demonstrated that the coupling between surface-adsorbed iodide and hot holes facilitated the hot-hole-driven surface etching of Au. Moreover, the examination of morphology evolution of intermediate Au nanostructures during the growth confirmed that preferential hot-hole-driven etching occurred on edges exposing more high-index facets, which caused non-uniform lateral growths and eventually led to the formation of Au nanostars. Taken together, our results established a clear picture of the essential role of hole-adsorbate cooperation in governing photochemical processes and enabling the control of nanostructure morphology in plasmon-driven synthesis.

Figure 6:
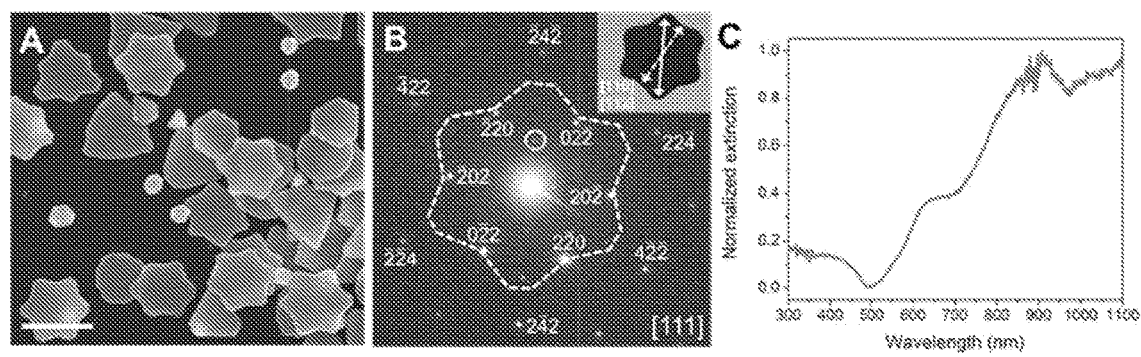
FIG. 6 illustrates the characterizations of Au nanostars.
Figure 7:
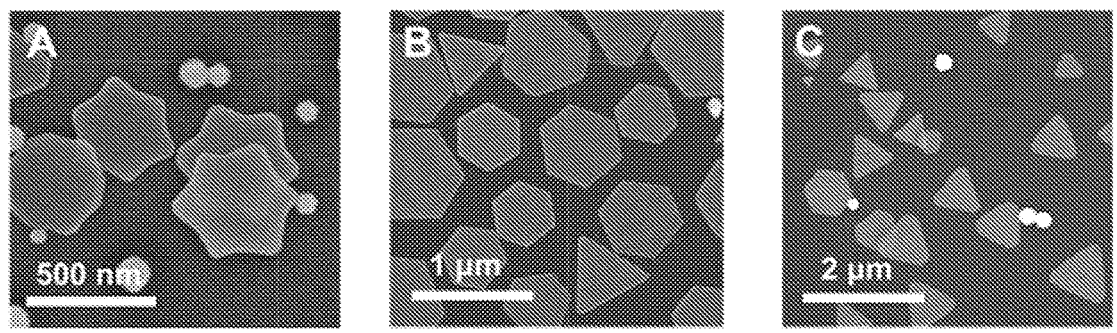
FIG. 7 illustrates SEM images of Au nanostructures formed under different experimental conditions.
Figure 8:
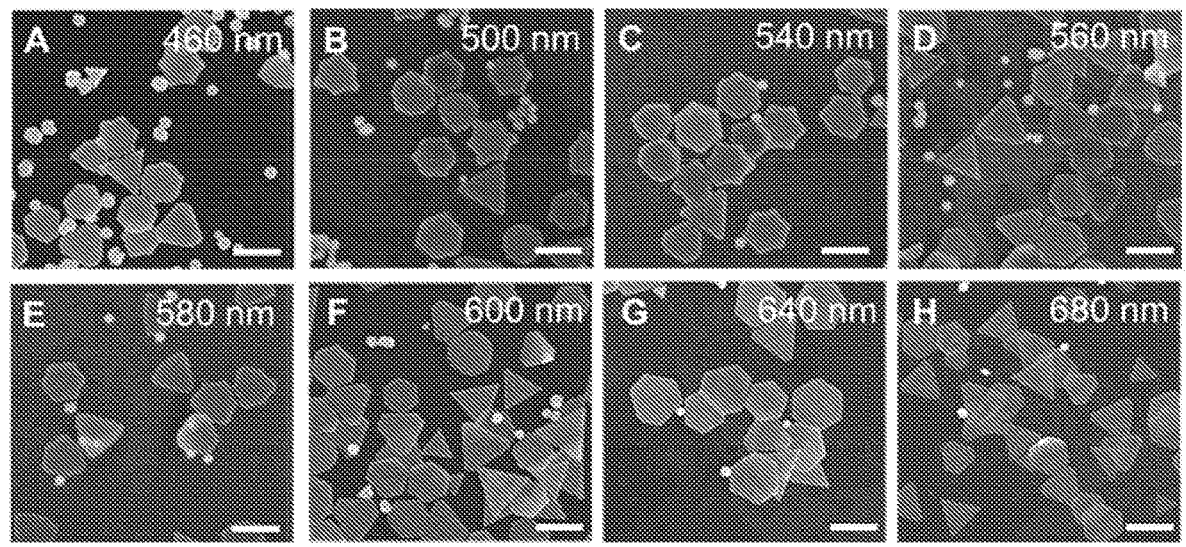
FIG. 8 illustrates SEM images of Au nanostructures formed from the plasmon-driven growth with different irradiation wavelengths.

In a typical experiment, a growth solution was irradiated at 520±10 nm (i.e., the SPR band of Au seeds)[7, 9, 13] for 20 minutes. Then, potassium iodide (KI, 4 μM) was added and the mixture was irradiated continuously for another 60 min. Interestingly, six-pointed Au nanostars with tip-to-tip length around 437±30 nm (FIG. 1A) were formed instead of previously reported regular Au nanoprisms.[6-7] Selected area electron diffraction (SAED) pattern of a flat-lying Au nanostar (FIG. 6A) was indexed to a [111] zone axis, suggesting that Au nanostars were single crystals bound by {111} facets on top and bottom faces. Further studies showed that similar Au nanostars were produced when replacing KI with sodium iodide (NaI, FIG. 7A). Meanwhile, only regular Au nanoprisms were found in the absence of iodide (FIG. 7B). Both results strongly suggested that iodide was necessary for forming Au nanostars.

Iodide is commonly used to passivate the growth of Au {111} facets for controlling the morphology of Au nanostructures in wet synthesis.[16-21] However, the aforementioned growth solution only generated regular Au nanoprisms in the dark (FIG. 7C), suggesting that the facet passivation by iodide should not govern the morphology evolution of Au nanostars. Thus, the formation of Au nanostars should arise from the participation of both iodide and the SPR excitation. It is noted that the SPR excitation generates three effects on Au nanoparticles: hot electron-hole pairs, enhanced local electromagnetic (EM) fields, and photothermal heating.[22-24] Under steady-state conditions, the high thermal conductivity of Au should create a homogeneous temperature distribution along Au seed nanoparticles,[25,26] making photothermal heating impossible to drive the anisotropic growth. Meanwhile, the symmetry of Au nanostars was found to be different from that of distribution of enhanced local EM fields excited by non-polarized light sources used in our study.[7, 27] Therefore, the formation of Au nanostars must involve hot-carrier-driven processes associated with iodide.

Interestingly, the formation of Au nanostars only occurred when irradiating the growth solution with shorter wavelengths of Au SPR (<600 nm, FIGS. 8A-8E). Using longer wavelengths (>600 nm) solely produced regular Au nanoprisms (FIGS. 1B, and 8F-8H). It has been known that the SPR excitation of Au nanoparticles prompts both intraband (sp→sp) and interband (d→sp) transitions with interband transitions being dominant at shorter wavelengths.[28-34] Intraband transitions distribute a larger portion of photon energy to hot electrons and generate lukewarm holes, while interband transitions generate a larger population of highly energetic d-band holes coupled with relatively less energetic electrons.[28-34] Nevertheless, both types of plasmon-generated hot electrons carry energies above the Fermi level of Au nanoparticles (0.7 V vs. normal hydrogen electrode, NHE) that is well above the reduction potential of $AuCl_4^-$ (1.002 V vs. NHE), making hot-electron-driven processes unlikely to have such an energy (i.e., wavelength) cut-off. Taken together, the coincidence of the observed wavelength dependence of nanostar formation and the interband transition threshold (ca. 2 eV, 620 nm)[30, 32-33] implied that those hot holes generated via interband transitions should work together with iodide to determine the formation of Au nanostars.

Iodide has been known as a hole-mediator in dye-sensitized solar cells, and the hot-hole-driven oxidative etching has been reported for the dissolution of Au and Ag nanostructures.[35-42] Thus, it is very likely that iodide in the growth solution strongly adsorbed on the surface of Au seed nanoparticles to form Au-iodide species;[43-44] plasmon-generated hot holes were then trapped and stabilized on the adsorbed iodide and drove the oxidative etching of $Au^0$. It is noted that iodide would also form stable complexes with $Au^+$ and $Au^{3+}$ ions to accelerate the oxidative etching of $Au^0$.[45]

Figure 2:
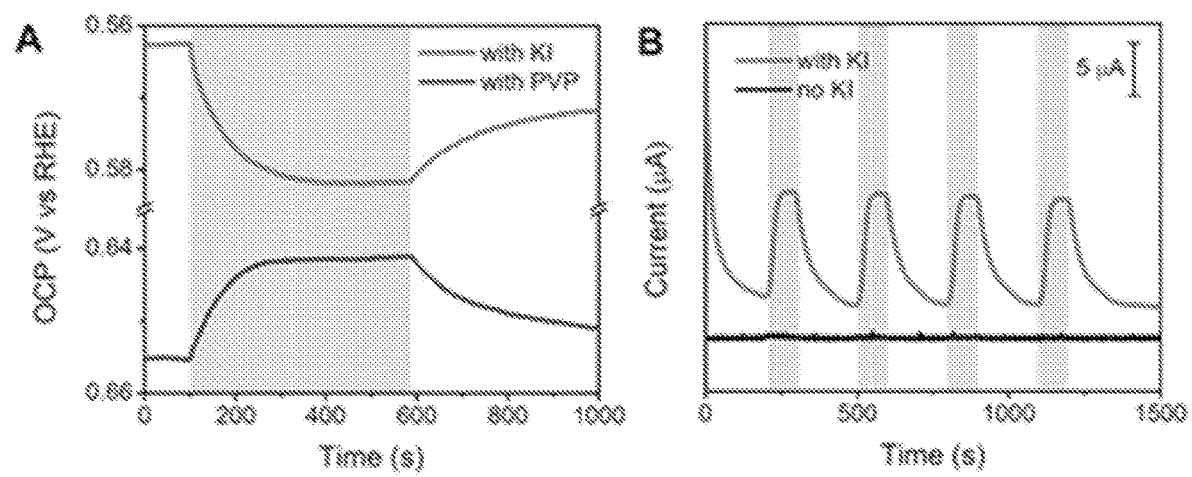
FIG. 2A illustrates an open-circuit potential (OCP) of Au nanocrystal electrode in the presence of 120 µM KI (red curve) and PVP (blue curve), respectively. The anodic change of an iodide-adsorbed Au electrode upon irradiation (shaded region) suggested that plasmon-generated hot holes were trapped and localized by surface Au-iodide species while hot electrons accumulated on the Au electrode and attracted cations from the bulk electrolyte. In contrast, the cathodic change on a PVP-adsorbed Au electrode suggested the attraction of anions from the bulk electrolyte by hot holes due to the trapping of hot electrons by PVP.
FIG. 2B illustrates chronoamperometry (1-t) of Au nanocrystal electrode at 1.03 V vs. RHE in the presence of 120 µM KI (red curve) and no KI (black curve). Shaded regions in both FIGS. 2A and B represent the light irradiation using 530±10 nm LED (240 mW/cm$^2$)
Figure 9:
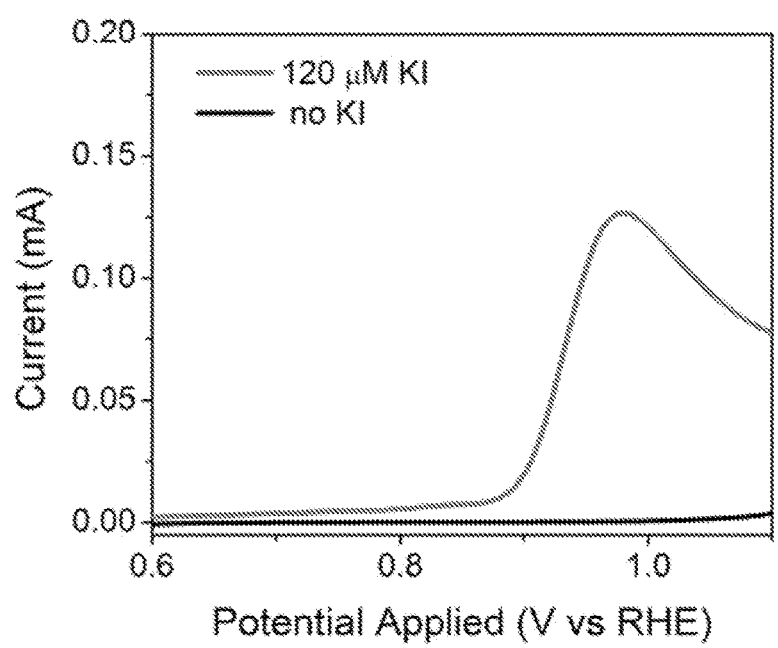
FIG. 9 illustrates a linear sweep voltammetry (LSV) scan obtained on Au nanocrystal electrodes in the presence (red curve) and absence (black curve) of 120 µM KI. A peak at ca. 0.95 V vs. RHE for the iodide-adsorbed electrode, which originated from the one-electron oxidation of Au$^0$ to AuI$_2^-$.[7]

The collective interaction between hot holes and iodide was verified by an anodic shift of OCP on a Au nanocrystal electrode pre-adsorbed with iodide under irradiation (FIG. 2A). It is noted that the photo-driven OCP shift reflects the sign of electrolyte ions attached to the electrode.[46-47] Thus, plasmon-generated hot holes were trapped and localized by surface Au-iodide species, while hot electrons were accumulated on the Au electrode and attracted cations from the bulk electrolyte, leading to the anodic OCP shift. This is in contrast to the cathodic OCP shift observed on an Au electrode adsorbed with electron-trapping polyvinylpyrrolidone (PVP) (FIG. 2A).[6-7] Furthermore, an oxidation peak at ca. 0.95 V vs. reversible hydrogen electrode (RHE) appeared in the linear sweep voltammetry (LSV) scan of an iodide-adsorbed Au nanocrystal electrode (FIG. 9), corresponding to the one-electron oxidation of $Au^0$ to $AuI_2^-$.[48] Moreover, chronoamperometry (l-t) measurements showed an enhanced steady-state anodic photocurrent in the presence of iodide (FIG. 2B), confirming that the cooperative interaction between hot holes and iodide facilitated the oxidative etching of $Au^0$.

Figure 3:
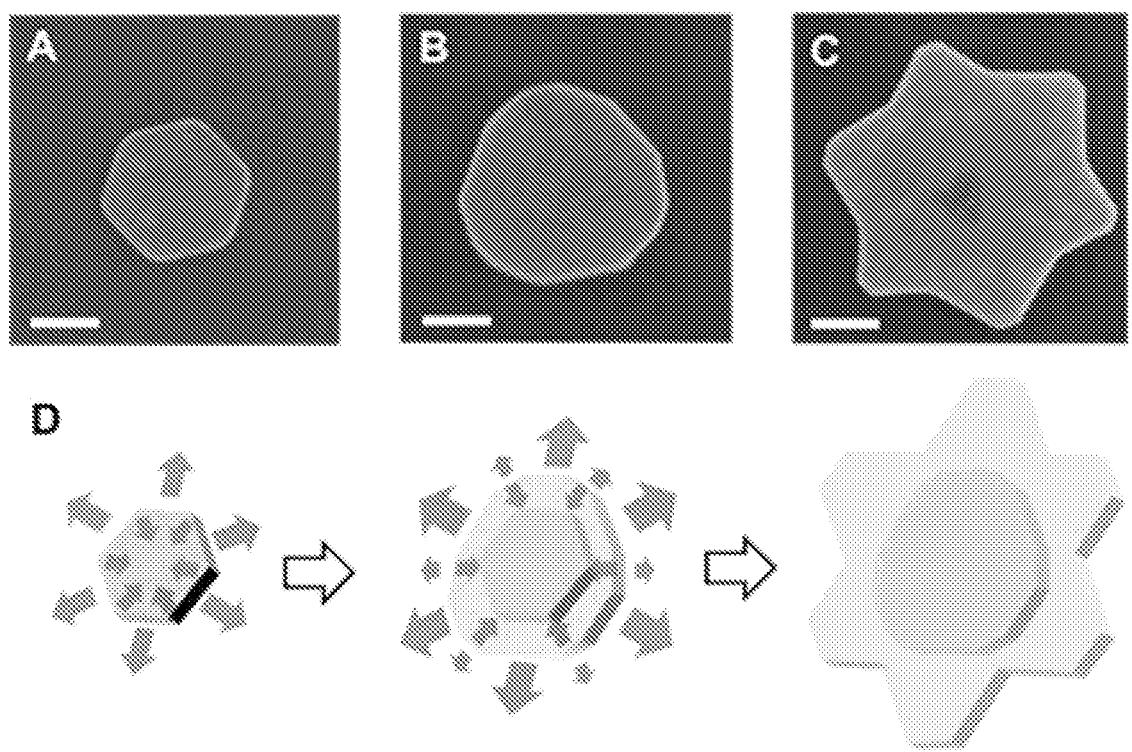
FIG. 3 illustrates the morphology evolution of Au nanostructures during the plasmon-driven growth.
Figure 10:
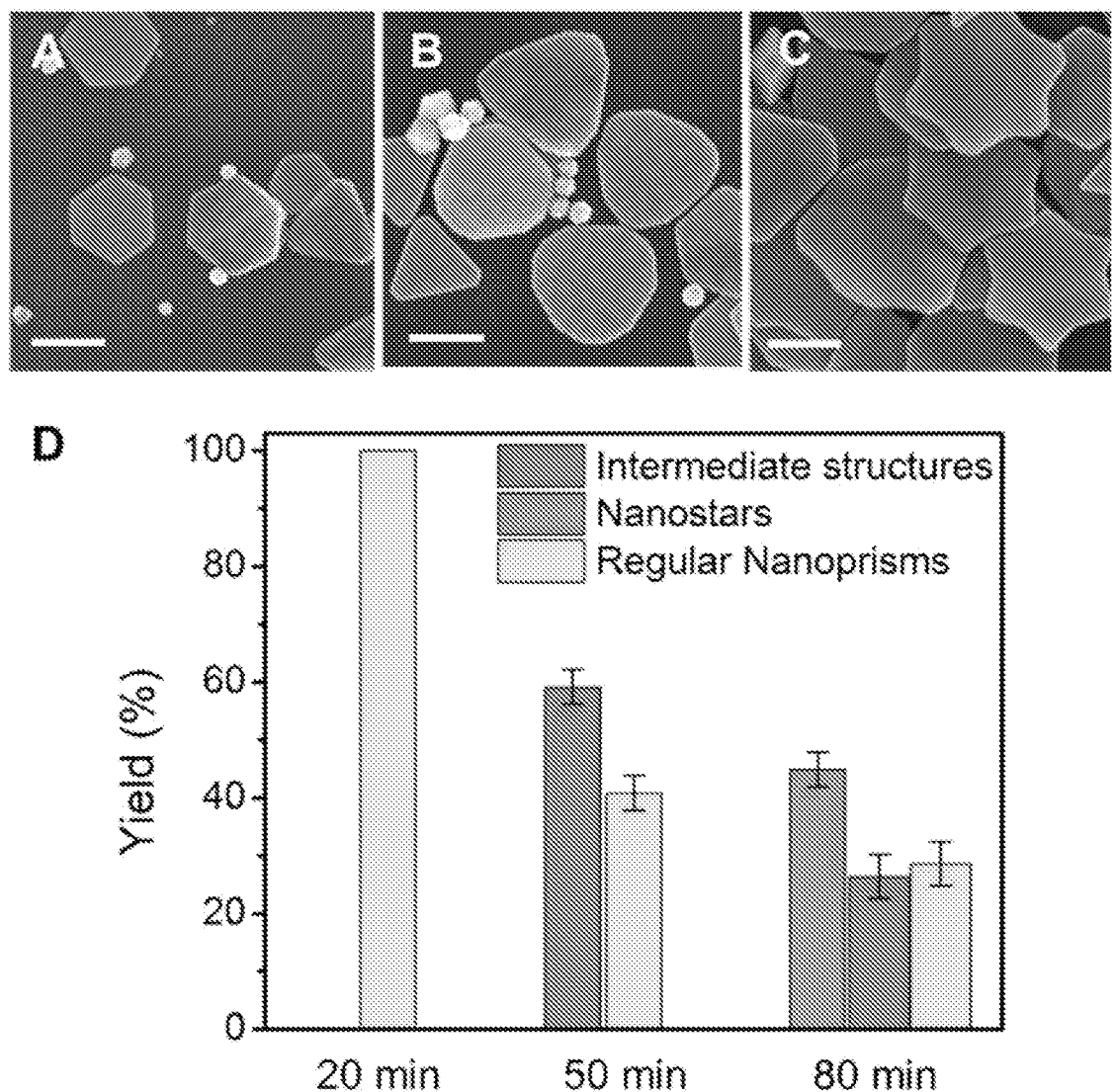
FIG. 10 illustrates SEM images showing the ensemble of Au nanostructures during the plasmon-driven growth in the presence of iodide after (FIG. 10A) 20 minutes, (FIG. 10B) 50 minutes, and (FIG. 10C) 80 minutes of growth.

The examination of shape evolution of Au seed nanoparticles revealed that the hot-hole-driven oxidative etching of $Au^0$ assisted by iodide played an important role in the formation of Au nanostars. It should be noted that due to the strong affinity of iodide to Au,[43-44] iodide should adsorb across the whole surface of Au seed nanoparticles and facilitate the etching of $Au^0$ at all exposed sites on growing Au nanostructures. However, the etching rate varied on different sites with different coordination numbers.[49] As shown in FIG. 3A and FIG. 10A, small hexagonal nanoprisms with edges mainly consisted of low-index Au {100} and Au {111} facets were formed in the initial 20-minute iodide-free growth.[4] Such a lateral growth was previously identified as a result of hot-electron-driven $Au^0$ deposition assisted by PVP adsorbed along edges of planar-twinned Au seeds.[7] When KI was added for a 30-minute growth, the size of those nanoprisms kept increasing, but their corners became truncated, forming dodecagonal structures with six edges preserved from initial hexagonal nanoprisms and six new edges intersecting original ones (FIGS. 3B, 3D, and 10B). The overall increase in size came from the hot-electron-driven deposition of $Au^0$, while the truncation of Au nanoprism corners resulted from the faster hot-hole-driven etching of $Au^0$ due to their lower coordination numbers.

Figure 4:
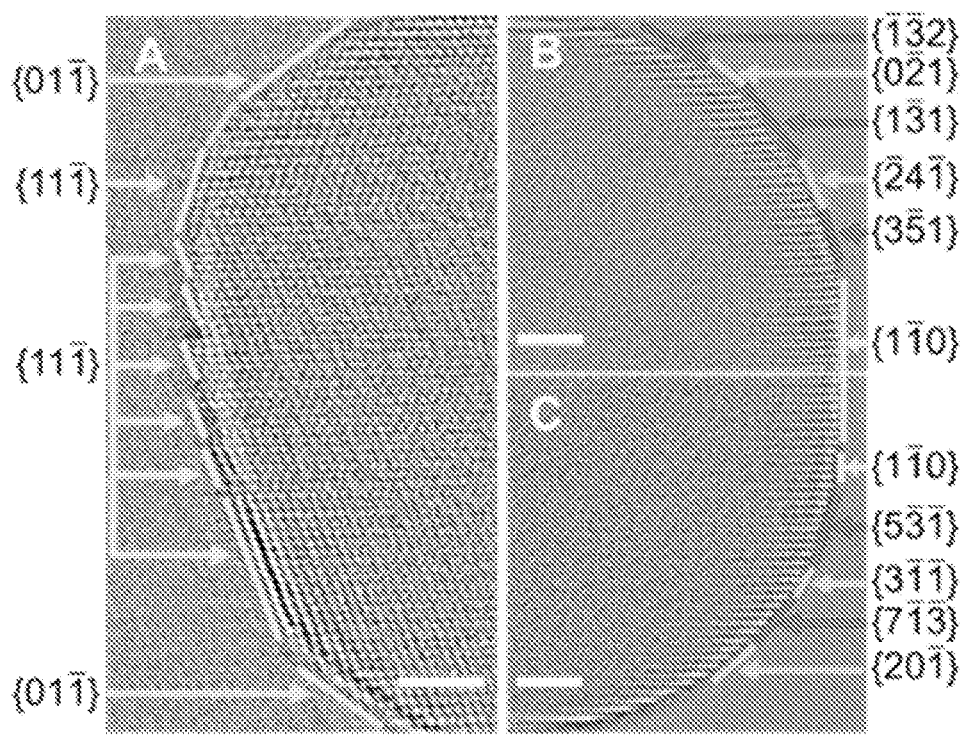
FIG. 4 illustrates filtered HAADF-STEM images along two edges of a single dodecagonal intermediate nanostructure (see FIG. 111 for more details).
Figure 11:
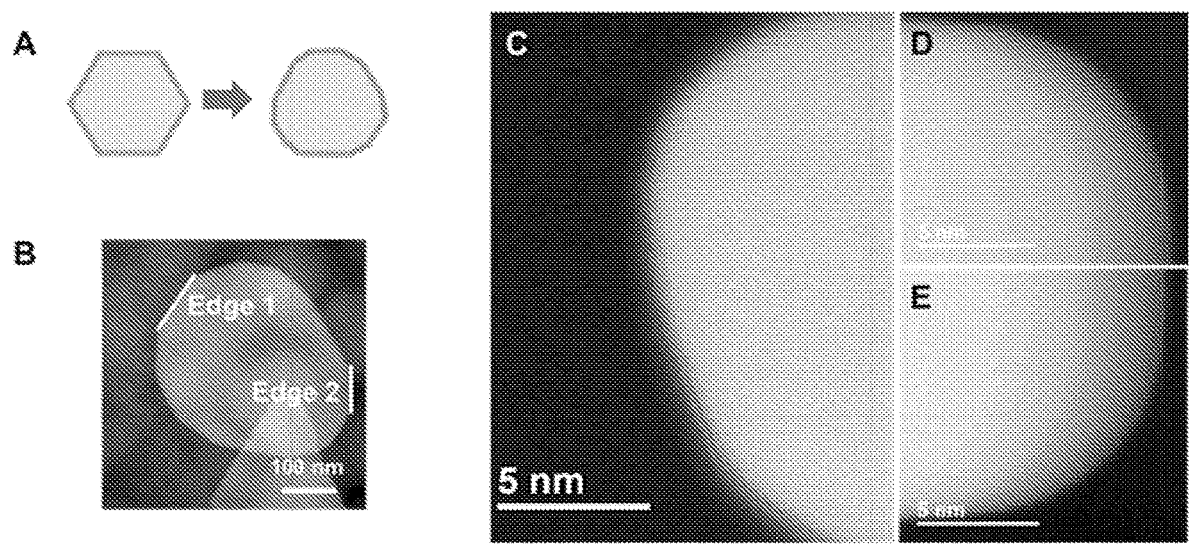
FIG. 11 illustrates facet identification of the intermediate structure formed during the growth of Au nanostars.
Figure 12:
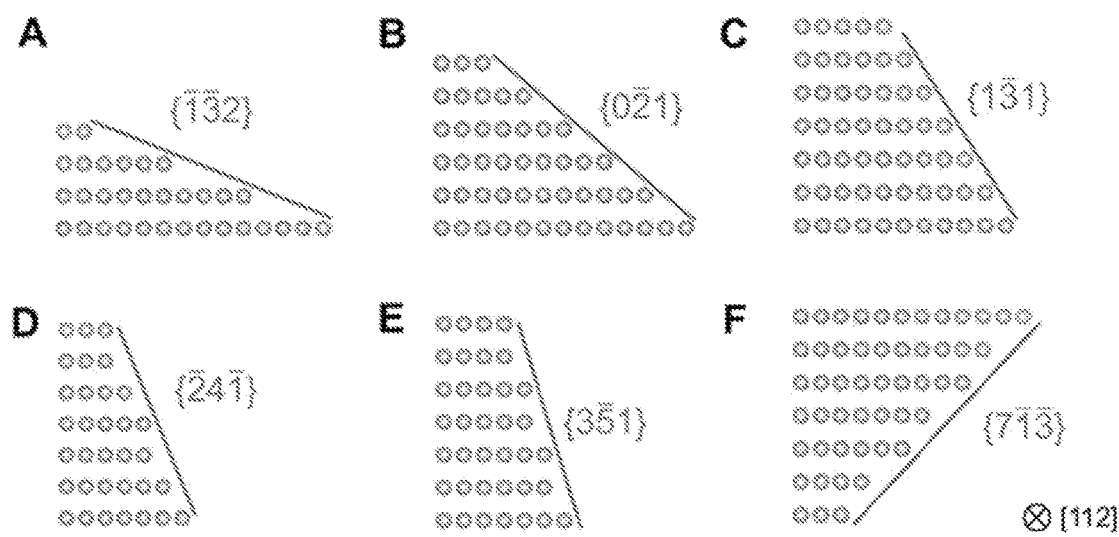
FIG. 12 illustrates schematics of high-indexed facets observed on dodecagonal intermediates as viewed along the [112] direction.

Furthermore, high-angle annular dark-field (HAADF) atomic-resolved scanning transmission electron microscopy (STEM) images identified that those Au dodecagonal nanostructures exhibited alternatively arranged low-index edges and high-index edges (FIGS. 4, 11, and 12, Table S1), in which low-index edges were preserved from initial Au nanoprisms (FIG. 4A) and high-index edges corresponded to new intersecting edges formed from the truncated corners (FIGS. 4B and 4C). Those high-index facets with more low-coordinated sites were expected to serve as active sites for hot-hole-driven oxidative etching of $Au^0$ and reduce the deposition rate of $Au^0$. Thus, non-uniform deposition rates along different growth directions would lead low-index edges to evolve into tips (faster growth) and high-index edges become trenches (slower growth) to form Au nanostars. Indeed, after another 30-minute growth, we observed that those dodecagonal structures grew into Au nanostars (FIGS. 3C and 3D).

Figure 13:
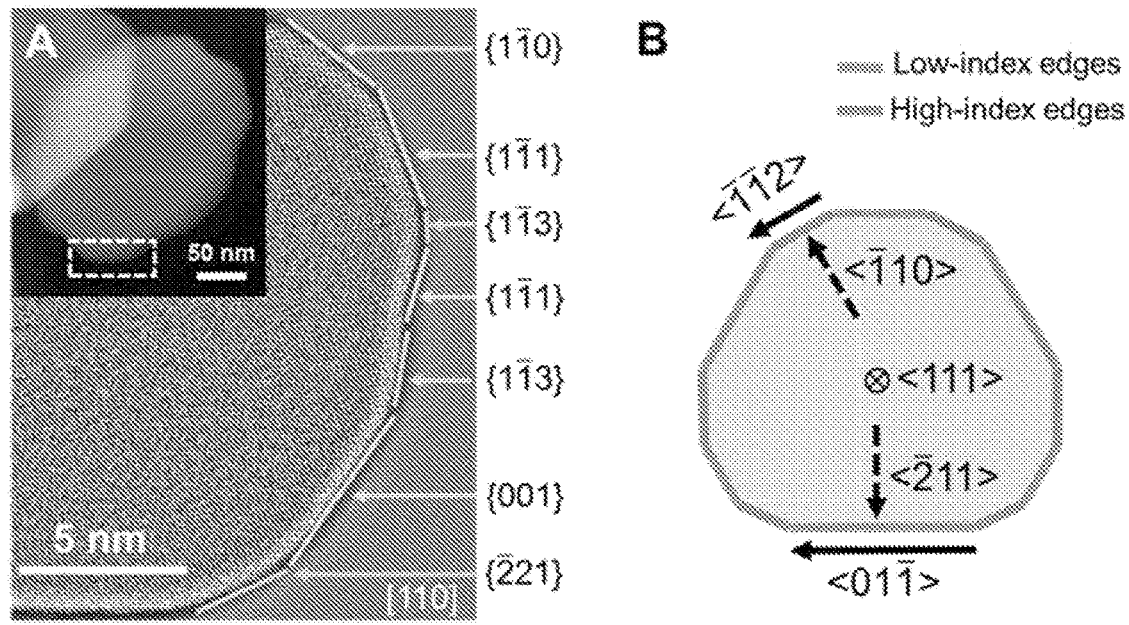
FIG. 13 illustrates the growth of dodecagonal intermediate nanostructures into Au nanostars.
Figure 14:
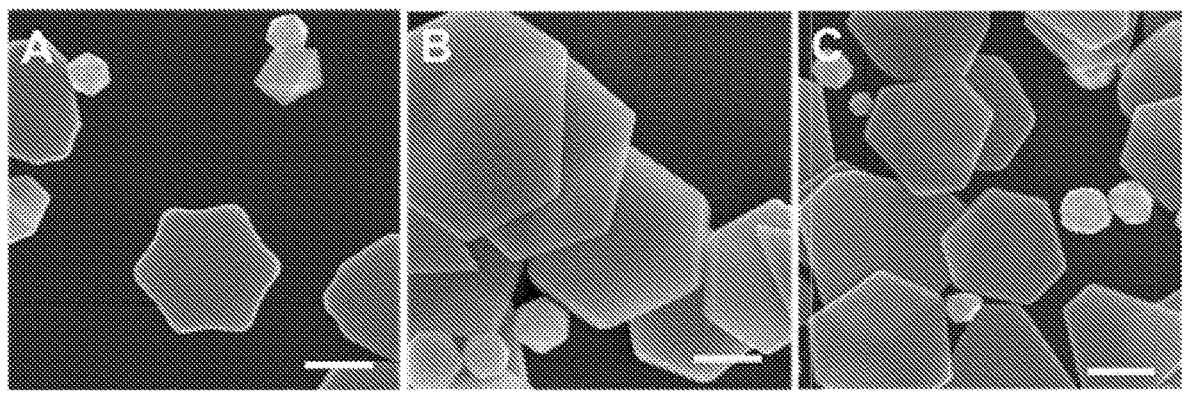
FIG. 14 illustrates SEM images showing the plasmon-driven synthesis of Au nanostars in the presence of KBr.
Figure 15:
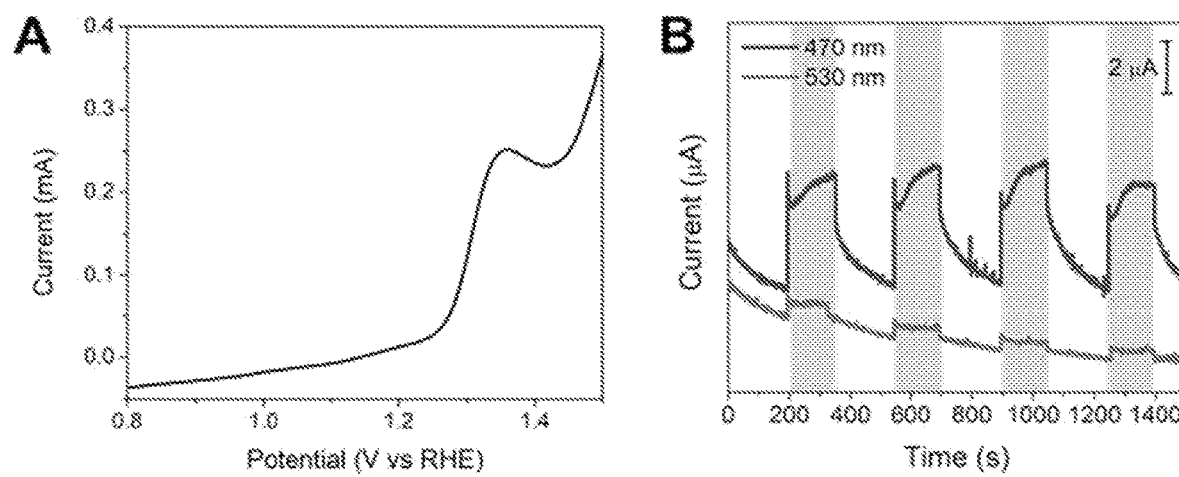
FIG. 15 illustrate photoelectrochemical results confirming the hot-hole-driven etching of Au$^0$ assisted by bromide.

In summary, we have demonstrated that the synergy between plasmon-generated hot carriers and surface adsorbates provided a unique control over the anisotropic growth of plasmonic nanostructures. More importantly, we discovered that iodide assisted the hot-hole-driven oxidative etching of Au seed nanoparticles preferentially at edges with high-index facets to counteract the hot-electron-driven $Au^0$ deposition, leading to non-uniform growths along different lateral directions to form Au nanostars. Elucidating the essential function of plasmon-generated hot holes in our studies affirmed that both hot holes and hot electrons can be utilized in the light-driven synthesis of nanostructures. Moreover, it should be noted that the discovered cooperation of hot holes and iodide in our plasmonic system can be extended to general photo-excited processes. For instance, Au nanostars were also obtained by directly exciting the interband transition of planar-twinned seeds using blue light ($470 \pm 10$ nm) in the presence of bromide (FIGS. 13 and 14). Taken together, our studies provide a comprehensive description of the interaction between hot carriers and surface adsorbates, and illustrate its great potential in regulating photochemical processes.

REFERENCES FOR EXAMPLE 1

(1) Jin, R.; Charles Cao, Y.; Hao, E.; Métraux, G. S.; Schatz, G. C.; Mirkin, C. A. Controlling anisotropic nanoparticle growth through plasmon excitation. *Nature* 2003, 425, 487-490.

(2) Xue, C.; Métraux, G. S.; Millstone, J. E.; Mirkin, C. A. Mechanistic Study of photomediated triangular silver nanoprism Growth. *J. Am. Chem. Soc.* 2008, 130, 8337-8344.

(3) Jin, R.; Cao, Y.; Mirkin, C. A.; Kelly, K. L.; Schatz, G. C.; Zheng, J. G. Photoinduced conversion of silver nanospheres to nanoprisms. *Science* 2001, 294, 1901-1903.

(4) Langille, M. R.; Personick, M. L.; Mirkin, C. A. Plasmon-mediated syntheses of metallic nanostructures. *Angew. Chem., Int. Ed.* 2013, 52, 13910-13940.

(5) Langille, M. R.; Zhang, J.; Mirkin, C. A. Plasmon-mediated synthesis of heterometallic nanorods and icosahedra. *Angew. Chem., Int. Ed.* 2011, 50, 3543-3547.

(6) Golze, S. D.; Hughes, R. A.; Rouvimov, S.; Neal, R. D.; Demille, T. B.; Neretina, S. Plasmon-mediated synthesis of periodic arrays of gold nanoplates using substrate-immobilized seeds lined with planar defects. *Nano Lett.* 2019, 19, 5653-5660.

(7) Zhai, Y.; DuChene, J. S.; Wang, Y. C.; Qiu, J.; Johnston-Peck, A. C.; You, B.; Guo, W.; DiCiaccio, B.; Qian, K.; Zhao, E. W.; Ooi, F.; Hu, D.; Su, D.; Stach, E. A.; Zhu, Z.; Wei, W. D. Polyvinylpyrrolidone-induced anisotropic growth of gold nanoprisms in plasmon-driven synthesis. *Nat. Mater.* 2016, 15, 889-895.

(8) Khorashad, L. K.; Besteiro, L. V.; Correa-Duarte, M. A.; Burger, S.; Wang, Z. M.; Govorov, A. O. Hot electrons generated in chiral plasmonic nanocrystals as a mechanism for surface photochemistry and chiral growth. *J. Am. Chem. Soc.* 2020, 142, 4193-4205.

(9) Zhai, Y.; Zhang, F.; Zhang, B.; Gao, X. Engineering single nanopores on gold nanoplates by tuning crystal screw dislocation. *Adv. Mater.* 2017, 29, 1703102.

(10) Redmond, P. L.; Brus, L. E. "Hot electron" photo-charging and electrochemical discharge dinetics of silver nanocrystals. *J. Phys. Chem. C* 2007, 111, 14849-14854.

(11) Redmond, P. L.; Wu, X.; Brus, L. Photovoltage and photocatalyzed growth in citrate-stabilized colloidal silver nanocrystals. *J. Phys. Chem. C* 2007, 111, 8942-8947.

(12) Wu, X.; Redmond, P. L.; Liu, H.; Chen, Y.; Steigerwald, M.; Brus, L. Photovoltage mechanism for room light conversion of citrate stabilized silver canocrystal seeds to large nanoprisms. *J. Am. Chem. Soc.* 2008, 130, 9500-9506.

(13) Wu, X.; Thrall, E. S.; Liu, H.; Steigerwald, M.; Brus, L. Plasmon induced photovoltage and charge separation in citrate-stabilized gold nanoparticles. *J. Phys. Chem. C* 2010, 114, 12896-12899.

(14) Thrall, E. S.; Preska Steinberg, A.; Wu, X.; Brus, L. E. The role of photon energy and semiconductor substrate in the plasmon-mediated photooxidation of citrate by silver nanoparticles. *J. Phys. Chem. C* 2013, 117, 26238-26247.

(15) Maillard, M.; Huang, P.; Brus, L. Silver nanodisk growth by surface plasmon enhanced photoreduction of adsorbed $[Ag^+]$. *Nano Lett.* 2003, 3, 1611-1615.

(16) DuChene, J. S.; Niu, W.; Abendroth, J. M.; Sun, Q.; Zhao, W.; Huo, F.; Wei, W. D. Halide anions as shape-

(17) Wang, J.; Li, Y. F.; Huang, C. Z. Identification of iodine-induced morphological transformation of gold nanorods. *J. Phys. Chem. C* 2008, 112, 11691-11695.

(18) Millstone, J. E.; Wei, W.; Jones, M. R.; Yoo, H.; Mirkin, C. A. Iodide ions control seed-mediated growth of anisotropic gold nanoparticles. *Nano Lett.* 2008, 8, 2526-2529.

(19) Liu, S.; Niu, W.; Firdoz, S.; Zhang, W. Iodide-switched deposition for the synthesis of segmented Pd—Au—Pd nanorods: crystal facet matters. *Langmuir* 2017, 33, 12254-12259.

(20) Meena, S. K.; Celiksoy, S.; Schafer, P.; Henkel, A.; Sonnichsen, C.; Sulpizi, M. The role of halide ions in the anisotropic growth of gold nanoparticles: a microscopic, atomistic perspective. *Phys. Chem. Chem. Phys.* 2016, 18, 13246-13254.

(21) Ha, T. H.; Koo, H.-J.; Chung, B. H. Shape-controlled syntheses of gold nanoprisms and nanorods influenced by specific adsorption of halide ions. *J. Phys. Chem. C* 2007, 111, 1123-1130.

(22) Brongersma, M. L.; Halas, N. J.; Nordlander, P. Plasmon-induced hot carrier science and technology. *Nat. Nanotechnol.* 2015, 10, 25-34.

(23) Wang, D.; Koh, Y. R.; Kudyshev, Z. A.; Maize, K.; Kildishev, A. V.; Boltasseva, A.; Shalaev, V. M.; Shakouri, A. Spatial and temporal nanoscale plasmonic heating quantified by thermoreflectance. *Nano Lett.* 2019, 19, 3796-3803.

(24) Zou, N.; Chen, G.; Mao, X.; Shen, H.; Choudhary, E.; Zhou, X.; Chen, P. Imaging catalytic hotspots on single plasmonic nanostructures via correlated super-resolution and electron microscopy. *ACS Nano* 2018, 12, 5570-5579.

(25) Fujiwara, H.; Suzuki, T.; Pin, C.; Sasaki, K. Localized ZnO growth on a gold nanoantenna by plasmon-assisted hydrothermal synthesis. *Nano Lett.* 2020, 20, 389-394.

(26) Baffou, G.; Quidant, R. Thermo-plasmonics: using metallic nanostructures as nano-sources of heat. *Laser Photonics Rev.* 2013, 7, 171-187.

(27) Matsuura, T.; Imaeda, K.; Hasegawa, S.; Suzuki, H.; Imura, K. Characterization of overlapped plasmon modes in a gold hexagonal plate revealed by three-dimensional near-field optical microscopy. *J. Phys. Chem. Lett.* 2019, 10, 819-824.

(28) Kim, Y.; Smith, J. G.; Jain, P. K. Harvesting multiple electron-hole pairs generated through plasmonic excitation of Au nanoparticles. *Nat. Chem.* 2018, 10 (7), 763-769.

(29) Schlather, A. E.; Manjavacas, A.; Lauchner, A.; Marangoni, V. S.; DeSantis, C. J.; Nordlander, P.; Halas, N. J. Hot hole photoelectrochemistry on Au@SiO$_2$@Au nanoparticles. *J. Phys. Chem. Lett.* 2017, 8, 2060-2067.

(30) Brown, A. M.; Sundararaman, R.; Narang, P.; Goddard, W. A., 3rd; Atwater, H. A. Nonradiative plasmon decay and hot carrier dynamics: effects of phonons, surfaces, and geometry. *ACS Nano* 2016, 10, 957-966.

(31) Barman, T.; Hussain, A. A.; Sharma, B.; Pal, A. R. Plasmonic hot hole generation by interband transition in gold-polyaniline. *Sci. Rep.* 2015, 5, 18276.

(32) Sundararaman, R.; Narang, P.; Jermyn, A. S.; Goddard, W. A., 3rd; Atwater, H. A. Theoretical predictions for hot-carrier generation from surface plasmon decay. *Nat. Commun.* 2014, 5, 5788.

(33) Bernardi, M.; Mustafa, J.; Neaton, J. B.; Louie, S. G. Theory and computation of hot carriers generated by surface plasmon polaritons in noble metals. *Nat. Commun.* 2015, 6, 7044.

(34) Zhang, Y.; He, S.; Guo, W.; Hu, Y.; Huang, J.; Mulcahy, J. R.; Wei, W. D. Surface-plasmon-driven hot electron photochemistry. *Chem. Rev.* 2018, 118, 2927-2954.

(35) Marrani, A. G.; Bonomo, M.; Dini, D. Adsorption dynamics of redox active species onto polarized surfaces of sensitized NiO. *ACS Omega* 2019, 4, 1690-1699.

(36) Bella, F.; Popovic, J.; Lamberti, A.; Tresso, E.; Gerbaldi, C.; Maier, J. Interfacial effects in solid-liquid electrolytes for improved stability and performance of dye-sensitized solar cells. *ACS Appl. Mater. Interfaces* 2017, 9, 37797-37803.

(37) Shin, H.; Kim, B.-M.; Jang, T.; Kim, K. M.; Roh, D.-H.; Nam, J. S.; Kim, J. S.; Kim, U.-Y.; Lee, B.; Pang, Y.; Kwon, T.-H. Surface state-mediated charge transfer of Cs$_2$SnI$_6$ and its application in dye-sensitized solar cells. *Adv. Energy Mater.* 2019, 9, 1803243.

(38) Zhao, J.; Nguyen, S. C.; Ye, R.; Ye, B.; Weller, H.; Somorjai, G. A.; Alivisatos, A. P.; Toste, F. D. A Comparison of Photocatalytic activities of gold nanoparticles following plasmonic and interband excitation and a strategy for harnessing interband hot carriers for solution phase photocatalysis. *ACS Cent. Sci.* 2017, 3, 482-488.

(39) Al-Zubeidi, A.; Hoener, B. S.; Collins, S. S. E.; Wang, W.; Kirchner, S. R.; Hosseini Jebeli, S. A.; Joplin, A.; Chang, W. S.; Link, S.; Landes, C. F. Hot Holes Assist Plasmonic Nanoelectrode Dissolution. *Nano. Lett.* 2019, 19, 1301-1306.

(40) Thambi, V.; Kar, A.; Ghosh, P.; Khatua, S. Light-controlled in situ bidirectional tuning and monitoring of gold nanorod plasmon via oxidative etching with FeCl$_3$. *J. Phys. Chem. C* 2018, 122, 24885-24890.

(41) Saito, K.; Tanabe, I.; Tatsuma, T. Site-selective plasmonic etching of silver nanocubes. *J. Phys. Chem. Lett.* 2016, 7, 4363-4368.

(42) Hoener, B. S.; Byers, C. P.; Heiderscheit, T. S.; De Silva Indrasekara, A. S.; Hoggard, A.; Chang, W.-S.; Link, S.; Landes, C. F. Spectroelectrochemistry of halide anion adsorption and dissolution of single gold nanorods. *J. Phys. Chem. C* 2016, 120, 20604-20612.

(43) Magnussen, O. M. Ordered anion adlayers on metal electrode surfaces. *Chem. Rev.* 2002, 102, 679-726.

(44) Almora-Barrios, N.; Novell-Leruth, G.; Whiting, P.; Liz-Marzan, L. M.; Lopez, N. Theoretical description of the role of halides, silver, and surfactants on the structure of gold nanorods. *Nano Lett.* 2014, 14, 871-875.

(45) Li, W. L.; Li, Y.; Xu, C. Q.; Wang, X. B.; Vorpagel, E.; Li, J. Periodicity, electronic structures, and bonding of gold tetrahalides [AuX$_4$]$^-$ (X=F, Cl, Br, I, At, Uus). *Inorg. Chem.* 2015, 54, 11157-11167.

(46) Scanlon, M. D.; Peljo, P.; Mendez, M. A.; Smirnov, E.; Girault, H. H. Charging and discharging at the nanoscale: Fermi level equilibration of metallic nanoparticles. *Chem. Sci.* 2015, 6, 2705-2720.

(47) Grätzel, M. Photoelectrochemical cells. *Nature* 2001, 414, 338-344.

(48) Aylmore, M. G. Chapter 27—Alternative lixiviants to cyanide for leaching gold ores. In *Gold Ore Processing*, second edition, Adams, M. D., Ed.; Elsevier: Cambridge, MA, 2016; pp 447-484.

(49) Villarreal, E.; Li, G. G.; Zhang, Q.; Fu, X.; Wang, H. Nanoscale surface curvature effects on ligand-nanoparticle interactions: a plasmon-enhanced spectroscopic study of thiolated ligand adsorption, desorption, and exchange on gold nanoparticles. *Nano Lett.* 2017, 17, 4443-4452.

Supplemental Information for Example 1

Experimental Procedures

Materials

Gold (III) chloride trihydrate (HAuCl$_4$), polyvinylpyrrolidone (PVP, Mw=40,000 Da), and potassium iodide (KI) were purchased from Sigma Aldrich. Methanol (99.8%) was obtained from Fisher Chemicals. All synthesis processes were performed with Nanopure H$_2$O (18.2 MΩ). All glassware was cleaned with Aqua Regia solution and rinsed thoroughly with Nanopure water before use (caution! Aqua regia is highly corrosive and toxic: handle with care and use appropriate personal protection equipment).

Instrumentation

The light source used for the plasmon-driven growth of Au nanostars was a halogen lamp (Dolan-Jenner MI-150) equipped with an internal IR holder/filter (to avoid excessive heating). Single-wavelength bandpass filters were purchased from Thorlabs. Ultraviolet-visible-near infrared (UV-Vis-NIR) spectra of products were collected using a Shimadzu UV-1800 spectrophotometer. Scanning electron microscopy (SEM) images of Au nanostars were collected using a FEI Nova Nano 430 SEM at the Nanoscale Research Facility of the University of Florida. Selected area electron diffraction (SAED) patterns and high-angle annular dark-field (HAADF) scanning transmission electron microscopy (STEM) images were acquired from a transmission electron microscope (TEM) operated at an accelerating voltage of 300 kV at Material Measurement Laboratory of National Institute of Standards and Technology (Note: Certain commercial equipment, instruments, or materials are identified in this paper in order to specify the experimental procedure adequately. Such identification is not intended to imply recommendation or endorsement by the National Institute of Standards and Technology, nor is it intended to imply that the materials or equipment identified are necessarily the best available for the purpose.). The probe forming optics of the instrument was aberration-corrected, and the convergence angle was set to approximately 13.5 mrad. HAADF-STEM images were acquired using a Fischione Model 3000 detector, in which the inner collection angle was set to approximately either 58 mrad or 71 mrad. Electrochemical experiments were conducted using an Autolab potentiostat (PGSTAT302N) from Metrohm. Light sources used in electrochemical experiments were single-wavelength LEDs (470 nm and 530 nm) with a maximum power density of 240 mW/cm$^2$.

Experimental Details

Synthesis of Au Nanostars:

Au seeds were synthesized using a previously reported method.[1,2] The seed solution was aged for more than two weeks before use. To synthesize Au nanostars, a solution containing 5 mL of H$_2$O, 500 µL of 5 mg/mL PVP solution, 500 µL of methanol, 400 µL of 10 mM HAuCl$_4$ solution, and 1 µL of aged seed solution was prepared (i.e., growth solution). The seed solution contained a mixture of planar-twinned seeds and penta-twinned seeds, while only planar-twinned seeds can lead to the formation of Au nanostars.[1] To isolate planar-twinned Au seeds from the mixture, the growth solution was incubated in a water bath at 24.5° C. under the dark condition for 24 h. Penta-twinned Au seeds were reported to grow faster in the dark and would gain a heavier mass after the incubation.[1] The incubated growth solution was then centrifuged at 10,000 rpm for 10 min, allowing for the precipitation of penta-twinned seeds. The supernatant of the growth solution after the centrifugation contained mainly planar-twinned seeds and was then transferred to a glass vial with a Teflon-lined cap for the plasmon-driven growth. The growth solution was irradiated by a halogen lamp equipped with a 520±10 nm bandpass filter at 3.4 mW/cm$^2$. After 20 min of irradiation, 20 µL of 1 mM KI solution was injected into the growth solution (overall KI concentration: 4 µM). The solution was then irradiated for another 60 min to complete the growth. The growth in the dark was carried out by storing the incubated and centrifuged growth solution in the dark at 50° C. for 24 h.

Wavelength-Dependent Growth

Wavelength-dependent growth was carried out after the incubation and centrifugation of a growth solution. It should be noted that small planar-twinned Au seeds in the growth solution only had strong absorption near 520 nm,[1] so that the growth would not happen if the growth solution was irradiated with wavelengths too far from 520 nm from the beginning of plasmon-driven synthesis. Instead, the growth solution was first irradiated at 520±10 nm for 20 min in the absence of iodide. This initial growth step enabled planar-twinned Au seeds to develop into anisotropic (prism-like) structures that exhibited a broader SPR absorption band.[1] After this initial growth, KI was added to the growth solution, and the mixture was irradiated using bandpass filters with targeting wavelength (from 460 nm to 640 nm) continuously for another 60 min.

Electrochemical Measurements:

Electrochemical measurements were carried out in a three-electrode electrochemical cell with a Pt wire counter electrode and a Ag/AgCl (3.5 M KCl) reference electrode. The working electrode was a Au nanocrystal electrode, which was fabricated by sputtering 10 nm of Au film on an FTO electrode and then calcinating for 2 h at 600° C. All electrochemical experiments were conducted in 50 mL of 0.5 M NaClO$_4$ with a pH value tuned to 3.0 using HClO$_4$ (i.e., the pH of the growth solution). To modify the Au nanocrystal electrode with iodide, the working electrode was immersed in a 0.5 M NaClO$_4$ solution containing KI until its rest potential became stable. The PVP-adsorbed electrode was prepared by emerging a Au nanocrystal electrode in a 20 mg/mL PVP solution overnight and then rinsing with water.

Figure 5:
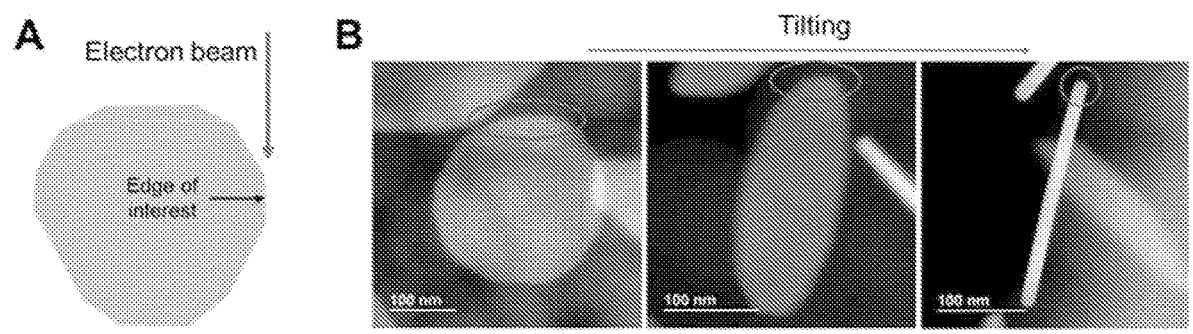
FIG. 5 illustrates the process of obtaining the atomic-resolved STEM image of an edge of a dodecagonal structure.

Edge Facets Identification Using STEM:

Dodecagonal intermediates obtained during the growth of Au nanostars were isolated from the growth solution and loaded on a C-supported Cu grid. Amorphous silica particles were deposited prior to the deposition of Au nanostars to tilt Au nanostars for imaging their edges. As shown in FIG. 5, the microscope stage was tilted in the STEM chamber to orient the nanostructure to an "edge-on" pattern, in which the edge of interest was aligned with the incident electron beam. The obtained STEM images were filtered using a "Trend Substrate" filter (HREM-Filters Lite version 3.0, HREM Research Inc.) as implemented in Digital Micrograph (Gatan Inc.) to enhance the visualization of atomic columns. The filter removed the low-frequency component of the image (background) that was prominent due to the combination of a high atomic number and a large sample thickness. Facets exposed on edges were then identified by matching the arrangement of atoms with that of characteristic crystal models.

Supplementary Figures and Tables

The facet analysis was conducted on 13 edges from 10 dodecagonal structures. Two types of edges with drastically different percentages of low-index regions (i.e., Au {111}, {110}, and {100}) and high-index regions were identified (Table S1). The first type of edges had approximately 68% low-index components, while the second type of edges only had about 23% low-index component. Edges with more high-index components corresponded to active sites for hot-hole-induced etching of Au⁰.

TABLE S1

Summary of edge facets of dodecagonal intermediates

| Structure # | Low-index component (%) | High-index ratio component (%) |
|---|---|---|
| Type 1 | | |
| 1 | 62.5 | 37.5 |
| 2 | 68.9 | 31.1 |
| 3 | 66.1 | 33.9 |
| 4 | 72.8 | 27.2 |
| 5 | 74.3 | 25.7 |
| 6 | 71.3 | 28.7 |
| 7 | 69.4 | 30.6 |
| 8 | 65.5 | 34.5 |
| 9 | 63.8 | 36.2 |
| 10 | 66.6 | 33.4 |
| Average | 68.1 ± 3.9 | 31.9 ± 3.9 |
| Type 2 | | |
| 11 | 20.8 | 79.2 |
| 12 | 20.0 | 80.0 |
| 13 | 28.7 | 71.3 |
| Average | 23.2 ± 4.8 | 76.8 ± 4.8 |

REFERENCES FOR SUPPLEMENTAL SECTION (S1) DuChene, J. S.; Niu, W.; Abendroth, J. M.; Sun, Q.; Zhao, W.; Huo, F.; Wei, W. D. Halide anions as shape-directing agents for obtaining high-quality anisotropic gold nanostructures. *Chem. Mater.* 2012, 25 (8), 1392-1399.

(S2) Zhai, Y.; DuChene, J. S.; Wang, Y. C.; Qiu, J.; Johnston-Peck, A. C.; You, B.; Guo, W.; DiCiaccio, B.; Qian, K.; Zhao, E. W.; Ooi, F.; Hu, D.; Su, D.; Stach, E. A.; Zhu, Z.; Wei, W. D. Polyvinyl pyrrolidone-induced anisotropic growth of gold nanoprisms in plasmon-driven synthesis. *Nat. Mater.* 2016, 15 (8), 889-895.

(S3) Langille, M. R.; Personick, M. L.; Mirkin, C. A. Plasmon-Mediated Syntheses of Metallic Nanostructures. *Angew. Chem., Int. Ed.* 2013, 52 (52), 13910-13940.

(S4) Kirkland, A. I.; Jefferson, D. A.; Duff, D. G.; Edwards, P. P.; Gameson, I.; Johnson, B. F. G.; Smith, D. J. Structural studies of trigonal lamellar particles of gold and silver. *Proc. R. Soc. A* 1993, 440 (1910), 589-609.

(S5) Carim, A. H.; Lew, K.-K.; Redwing, J. M. Bicrystalline silicon nanowires. *Adv. Mater.* 2001, 13 (19), 1489-1491.

(S6) Germain, V.; Li, J.; Ingert, D.; Wang, Z. L.; Pileni, M. P. Stacking faults in formation of silver nanodisks. *J. Phys. Chem. B* 2003, 107 (34), 8717-8720.

(S7) Aylmore, M. G. Chapter 27—Alternative lixiviants to cyanide for leaching gold ores. In *Gold Ore Processing*, second edition, Adams, M. D., Ed.; Elsevier: Cambridge, MA, 2016; pp 447-484.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The invention claimed is:

1. A composition, comprising: a nanoparticle having six pointed areas so that the nanoparticle resembles a six-pointed star, wherein a distance from opposing points of the six-pointed star is about 400 to 480 nanometers and a thickness of about 20 to 50 nanometers.

2. The composition of claim 1, wherein the nanoparticle is a gold nanoparticle.

3. The composition of claim 1, wherein the distance from opposing points of the six-pointed star is about 410 to 480 nanometers.

4. The composition of claim 1, wherein the nanoparticle is a silver nanoparticle.

5. The composition of claim 1, wherein the nanoparticle is a copper nanoparticle.

6. A method of making a nanoparticle comprising:
irradiating a metal nanoparticle growth solution at a first wavelength of less than 600 nanometers for a first time-frame;
introducing an iodide compound to the growth solution to form a modified growth solution and irradiating the modified growth solution at a second wavelength of less than 600 nanometers for a second time-frame; and
forming the metal nanoparticle having six pointed areas so that the metal nanoparticle that resembles a six-pointed star, wherein a distance from opposing points of the six-pointed star is about 400 to 480 nanometers and a thickness of about 20 to 50 nanometers.

7. The method of claim 6, wherein the first time-frame is about 20 minutes.

8. The method of claim 6, wherein the second time-frame is about 60 minutes.

9. The method of claim 6, herein the first wavelength is about 510 to 530 nanometers.

10. The method of claim 9, wherein the second wavelength is about 510 to 530 nanometers.

11. The method of claim 6, wherein the metal nanoparticle growth solution is $HAuCl_4$.

12. The method of claim 6, wherein the iodide compound is a salt of iodide.

13. The method of claim 12, wherein the salt of iodide is a potassium iodide.

14. A composition comprising: a nanoparticle made from the method of claim 6.

15. A structure comprising: a composition of claim 1.

16. The structure of claim 15, wherein the structure is a smart window.

17. A catalytic system comprising: a composition of claim 1.

* * * * *